Patented Nov. 24, 1925.

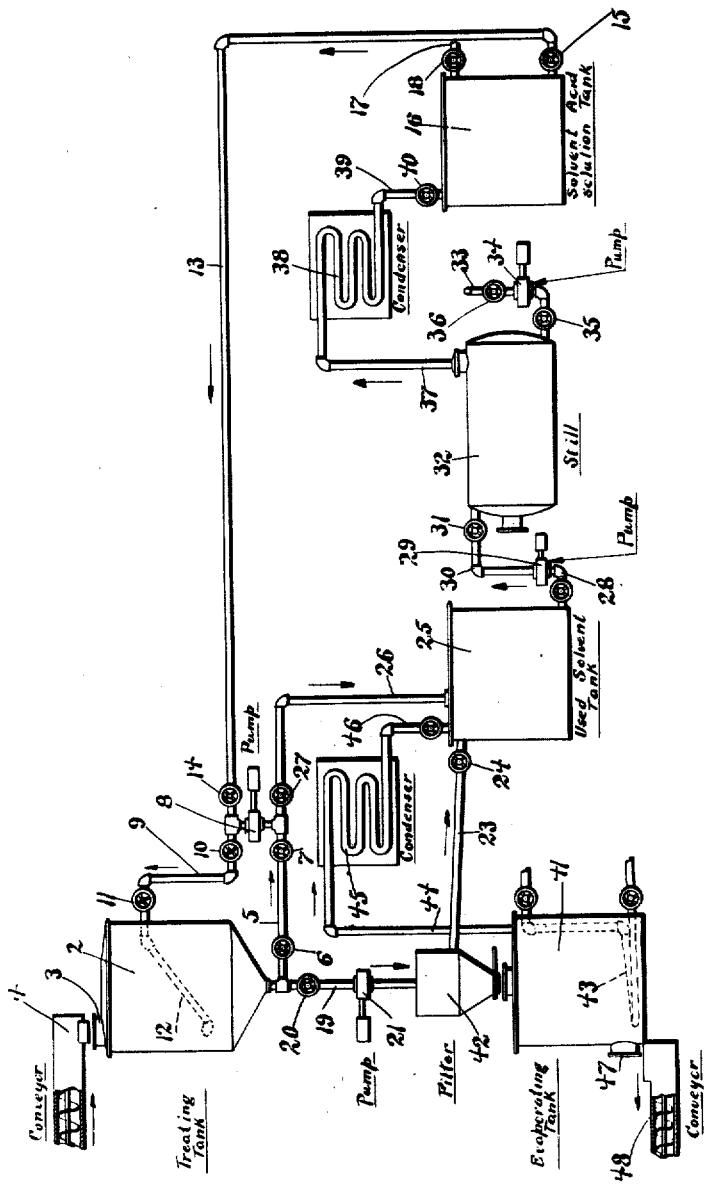

1,562,868

UNITED STATES PATENT OFFICE.

MARVIN L. CHAPPELL, OF INGLEWOOD, CALIFORNIA, ASSIGNOR TO STANDARD OIL COMPANY, OF SAN FRANCISCO, CALIFORNIA, A CORPORATION OF CALIFORNIA.

PROCESS OF TREATING DECOLORIZING AND CLARIFYING HYDROUS MAGNESIUM SILICATES.

Application filed October 15, 1924. Serial No. 743,746.

*To all whom it may concern:*

Be it known that I, MARVIN L. CHAPPELL, a citizen of the United States, residing at Inglewood, in the county of Los Angeles and State of California, have invented a new and useful Process of Treating Decolorizing and Clarifying Hydrous Magnesium Silicates, of which the following is a specification.

This invention relates to a method for treating agents suitable for clarifying and decolorizing petroleum oils and refers particularly to a process of revivifying a clarifying and decolorizing hydrous magnesium silicate.

Hitherto certain forms of hydrous magnesium silicates have been employed as clarifying and decolorizing agents in the treatment of petroleum oils. Certain of these hydrous magnesium silicates have been found to possess a clarifying and decolorizing efficiency of from two to as high as four times that of Florida fuller's earth. After such material has been employed in the clarifying or decolorizing of petroleum oils, it is found that the present known methods of revivifying other clarifying and decolorizing agents are ineffective to completely restore the original active clarifying and decolorizing powers of the agent.

I have discovered a process by which clarifying and decolorizing agents of the hydrous magnesium silicate class may be treated to obtain not only a complete recovery of the original clarifying and decolorizing properties of the agent, but also an additional clarifying and decolorizing efficiency of from two to as high as five per cent or more, thereby producing an agent having a clarifying and decolorizing efficiency ranging from 102 to as high as 105 per cent as compared with the agent before used.

More specifically, I have found that clarifying and decolorizing agents of the hydrous magnesium silicate class can be most effectively revivified by the use of a color solvent containing sulfuric acid, provided that the quantity of sulfuric acid employed upon the agent is within certain limits hereinafter set forth.

The clarifying and decolorizing agents to be treated by this process belong to that class of hydrous magnesium silicates having high natural clarifying and decolorizing properties, such as materials belonging to the serpentine and talc division as classified in Dana's text-book of Mineralogy, 1912 edition, published by John Wiley & Sons. Such natural clarifying and decolorizing agents of the serpentine and talc division are principally silicates of magnesium although they may contain lesser quantities of aluminum and other minerals.

As a specific example the following is an analysis of a clarifying and decolorizing agent having a high natural decolorizing property with reference to petroleum oils and which may be revivified for reuse by the process of this invention and which after revivification will possess even a greater clarifying and decolorizing property than the original natural agent. This particular clarifying and decolorizing agent was obtained from the Amargosa Valley, Nevada:

|  | Per cent. |
|---|---|
| $SiO_2$ | 55.40 |
| $MgO$ | 23.30 |
| $Al_2O_3$ | 4.97 |
| Free $H_2O$ | 9.40 |
| Combined $H_2O$ and vol. matter | 6.93 |

Such clarifying and decolorizing agents when employed to clarify and improve the color of petroleum oil in accordance with the processes described in U. S. Patents Number 1,404,374 and 1,404,375, granted to Marvin L. Chappell and Merle M. Moore, or employed in any other preferred manner for the decolorizing and clarifying of petroleum oils may be revivified by the process of this invention.

In the process I employ an organic solvent containing sulfuric acid in solution. Such organic solvent preferably contains a ketone, such as acetone, methyl-ethyl ketone, ethyl ketone or ethyl-propyl-ketone of which acetone for commercial reasons is preferred. The organic solvent also preferably includes alcohol of which methyl, ethyl, propyl or butyl may be used. To the color solvent is preferably added a solvent suitable to dissolve such mineral oil as may be left in the clarifying and decolorizing agent. Such oil solvent may be a hydrocarbon derived from petroleum oil or an aromatic hydrocarbon such as benzol, toluol, xylol or mixtures of any such or like mineral solvents.

In order to illustrate a specific example of a process embodying the invention, reference is made to the accompanying drawings which illustrate diagrammatically an apparatus in which the process may be conducted, it being understood that the invention is for the method and not limited to the use of any particular apparatus or to the specific example of the method given for illustration.

Referring to the drawings, 2 indicates a tank provided with a top with a manhole 3 into which a conveyor 4 is positioned to empty, said conveyor leading from the source of spent agent, not shown. To the bottom of the tank 2 is connected a pipe 5 which is provided with suitable valves 6 and 7 and leads to the outlet end of a pump 8. To the outlet end of the pump 8 is connected a pipe 9 controlled by valves 10 and 11 terminating in the tank 2 in the swing pipe section 12. Thus the tank 2 is provided with a circulating system comprising the swing pipe section 12, pipe 9, pump 8 and pipe 5.

Leading from the inlet side of the pump 8 is a line 13 which is controlled by valves 14 and 15 and communicates with a solvent acid solution tank 16 at its bottom. Said tank 16 is provided with a suitable inlet pipe 17 controlled by a valve 18 such inlet pipe 17 leads to a source of said solvent solution (not shown).

The bottom of tank 2 is connected by a pipe 19 and controlled by a valve 20 which is connected to the inlet end of a pump 21 the outlet end of the pump being connected to a filter 22. The filter 22 may be of any well-known type either operated under vacuum or pressure and is provided with a pipe 23 controlled by a valve 24 which pipe is arranged to conduct filtered liquid to a used solvent solution tank 25. A pipe 26 controlled by a valve 27 connects the outlet end of the pump 8 to the top of said tank 25. Said tank 25 is provided with a line 28 connected to an inlet end of a pump 29, the discharge end of the pump connecting through a line 30 controlled by a valve 31 with a still 32.

The still 32 may be of any preferred construction, for similar distillation operations, the still 32 preferably being provided with a draw-off pipe 33 which is shown including a pump 34 with valves 35 and 36 at opposed sides of the pump. A vapor line 37 leads from the top of the still 32 to a condenser 38. Said condenser 38 discharges through a line 39 controlled by a valve 40 into the top of the acid solution tank 16.

An evaporating tank 41 is positioned under the filter 22 and provided with a man-hole 42 through which the agent may be introduced from the filter 22. A suitable steam coil 43 is provided within the evaporating tank 41. 44 indicates a vapor line which leads from the evaporating tank 41 to a condenser 45. Said condenser 45 discharges through a line 46 into the tank 25. At the bottom of the evaporating tank 41 is provided a man-hole 47 and a conveyor 48 is positioned under the man-hole and is adapted to carry away the finished agent.

In conducting the process of a solvent mixture containing sulfuric acid in solution is introduced into the tank 16 through the pipe 17. As an example of a suitable solvent mixture said mixture may contain ten parts by volume of acetone, thirty parts by volume of denatured ethyl alcohol and sixty parts by volume of gasoline. Such a solvent constitutes both an oil and color solvent. To this mixture is added from one to five volumes of 41.4° Baumé sulfuric acid it being understood that the strength of acid added may be varied somewhat without destroying the advantages to be derived from the invention and will depend somewhat upon the strength of denatured alcohol employed.

The desired quantity of acid solvent contained in tank 16 is then introduced into the treating tank 2 passing through pipe 16 into suction side of pump 8 which discharges into pipe 5 and passes into the bottom of the treating tank 2, valves 15, 14, 7 and 6 being open and valves 20, 21, 10 and 11 being closed. As soon as sufficient quantity of acid solvent has been introduced into the treating tank 2 valves 15 and 14 are closed and valves 10 and 11 are opened which permit the acid solvent to circulate passing through the swing pipe 12 through pipe 9 into suction end of pump 8 which discharges into the bottom of treating tank 2 through pipe 5 thus producing an agitation therein.

The desired quantity of spent clarifying and decolorizing agent which is understood to belong to the hydrous magnesium silicate class, is then introduced into the treating tank 2 by operation of the conveyor; the material being introduced through man-hole 3. The relative proportions of acid solvent and clarifying and decolorizing agent may be widely varied, however in practice it is found convenient to employ six pounds of agent for every gallon of solvent during a single wash.

Circulatory agitation of the acid solvent is maintained in the treating tank 2 during introduction of the spent clarifying and decolorizing agent and maintained until the solution action is complete after which pump 8 is stopped and the mixture is allowed to stand until the washed agent has settled to the bottom of the treating tank 2.

As soon as substantially all of the washed agent has settled to the bottom of the treating tank 2, swing pipe 12 is adjusted so that most of the used acid solvent may be separated from the washed agent. This is accomplished by operating pump 8, valves 7 and 6 being closed and valve 27 being open. Thus most of the settled acid solution is separated from the washed agent and discharged through pipe 26 into the spent solvent receiving tank 25.

In a like manner as before the said agent is again given two, three or more washes with acid solvent until it is substantially free of impurities.

During the subsequent washes of the clay it is not generally necessary to employ acid in the solvent. Apparently the initial treatment of the agent with the acid solvent is sufficient to enable the solvent without the acid to completely remove the coloring matter from the agent.

As soon as the washed agent contained in the treating tank 2 is sufficiently free of impurities the agent is conducted to the filter 22 which separates more of the used solvent from the washed agent by a pressing operation. The washed, pressed agent still containing a small percentage of solvent passes from filter press 32 into the evaporator 41 which is heated by steam passing through steam coils 43. In the evaporator 41 the washed agent is completely free of the remaining solvent which is there converted into a vapor and passes through vapor line 44 and is condensed in cooling coil 45 being collected in tank 25.

As soon as the washed and treated agent is free of the solvent, it is conducted to storage by conveyor 48 and can be used again to clarify and decolorize petroleum oil.

The used solvent contained in tank 25 is recovered for reuse by a distillation operation. Pump 25 discharges the used solvent into the still 32 wherein the solvent is vaporized, passes through vapor line 37, is condensed in cooling coil 39, and passes finally into the solvent tank 16 for reuse. After the distillation operation of the used solvent there remains in the bottom of the still 32 the petroleum oil which was retained by the agent in the clarifying and decolorizing operation, the coloring matter which was extracted and a small percentage of mineral solvents extracted during the revivifying operation.

An important feature of the invention is the utilization of an acid solvent solution containing just the requisite sulfuric acid to effect a complete revivification of the original active properties of the decolorizing agent. In fact by use of the proper quantity of the sulfuric acid in the acid solvent I am enabled to produce a revivified agent containing a greater efficiency than the original clay.

For the purpose of illustration, the accompanying tabulation shows the relative efficiency of the revivified clarifying and decolorizing agent using different quantities of sulfuric acid in the acid solvent.

In the first column is shown the per cent by weight of 41.4° Baumé sulfuric acid added to the mixture organic solvents to form the acid solvent. In the second column is shown the actual percentage by weight of $H_2SO_4$ added to the solvent. In the third column is indicated the per cent efficiency of revivified clarifying and decolorizing agent, the original active purities of the agent being considered 100%.

| 41.4 Bé., sulfuric | $H_2SO_4$ | Efficiency |
|---|---|---|
| Per cent | Per cent | Per cent |
| 1 | ½ | 100 |
| 2 | 1 | 100 |
| 5 | 2½ | 105 |
| 7 | 3½ | 90 |
| 10 | 5 | 60 |

It will be observed that with quantities of sulfuric acid less than 7% by weight (corresponding to less than 5% by volume) the revivified agent possesses at least as high a decolorizing efficiency as the natural agent, and by selecting a solvent of the proper acid strength the revivified agent can be made as high as 5% more efficient that the natural agent.

It is understood that various modifications and changes in the process may be made without departing from the spirit of this invention. This invention is not limited to the specific process described, but is of the scope set forth in the following claims.

I claim:

1. The process of treating spent decolorizing and clarifying agent containing as the basic ingredient hydrous magnesium silicate which comprises contacting the silicate with a color solvent containing the requisite sulfuric acid to restore at least the original decolorizing and clarifying powers of the silicate.

2. The process of treating spent clarifying and decolorizing agent containing as the basic ingredient hydrous magnesium silicate, which comprises washing the spent silicate with a color solvent containing sulfuric acid.

3. The process of treating a spent clarifying and decolorizing agent containing as the basic ingredient hydrous magnesium silicate which comprises washing said spent silicate with a color solvent containing less than 3½% by weight of sulfuric acid.

4. The process of revivifying a spent clarifying and decolorizing agent containing as the basic ingredient hydrous magnesium silicate, which comprises washing such silicate with a color solvent containing a ketone and sulfuric acid.

5. The process of treating a spent clarifying and decolorizing agent containing as the basic ingredient hydrous magnesium silicate which comprises washing the spent silicate with a color solvent containing sulfuric acid.

6. The process of revivifying spent clarifying and decolorizing agent containing as the basic ingredient hydrous magnesium silicate which includes washing the spent silicate with a solvent containing a ketone and less than 3½% by weight of sulfuric acid.

7. The process of revivifying spent clarifying and decolorizing agent containing as the basic ingredient hydrous magnesium silicate which comprises washing the spent silicate with a solvent containing the requisite sulfuric acid to restore the silicate to a clarifying and decolorizing efficiency in excess of its natural efficiency.

8. The process of revivifying spent clarifying and decolorizing agent containing as the basic ingredient hydrous magnesium silicate which comprises treating said spent silicate with a solvent comprising acetone and alcohol and the requisite sulfuric acid to restore at least the natural clarifying and decolorizing properties of the silicate.

Signed at Los Angeles, California, this 19th day of September, 1924.

MARVIN L. CHAPPELL.

silicate which comprises washing the spent silicate with a color solvent containing sulfuric acid.

6. The process of revivifying spent clarifying and decolorizing agent containing as the basic ingredient hydrous magnesium silicate which includes washing the spent silicate with a solvent containing a ketone and less than 3½% by weight of sulfuric acid.

7. The process of revivifying spent clarifying and decolorizing agent containing as the basic ingredient hydrous magnesium silicate which comprises washing the spent silicate with a solvent containing the requisite sulfuric acid to restore the silicate to a clarifying and decolorizing efficiency in excess of its natural efficiency.

8. The process of revivifying spent clarifying and decolorizing agent containing as the basic ingredient hydrous magnesium silicate which comprises treating said spent silicate with a solvent comprising acetone and alcohol and the requisite sulfuric acid to restore at least the natural clarifying and decolorizing properties of the silicate.

Signed at Los Angeles, California, this 19th day of September, 1924.

MARVIN L. CHAPPELL.

Certificate of Correction.

Patent No. 1,562,868.  Granted November 24, 1925, to

MARVIN L. CHAPPELL.

It is hereby certified that error appears in the printed specification of the above-numbered patent requiring correction as follows: Page 4, line 2, claim 5, after the word "color" insert the words *and oil;* and that the said Letters Patent should be read with this correction therein that the same may conform to the record of the case in the Patent Office.

Signed and sealed this 4th day of October, A. D. 1927.

[SEAL.]

M. J. MOORE,
*Acting Commissioner of Patents.*

Certificate of Correction.

Patent No. 1,562,868.  Granted November 24, 1925, to

MARVIN L. CHAPPELL.

It is hereby certified that error appears in the printed specification of the above-numbered patent requiring correction as follows: Page 4, line 2, claim 5, after the word "color" insert the words *and oil;* and that the said Letters Patent should be read with this correction therein that the same may conform to the record of the case in the Patent Office.

Signed and sealed this 4th day of October, A. D. 1927.

[SEAL.]

M. J. MOORE,
*Acting Commissioner of Patents.*